United States Patent [19]

Kajimoto et al.

[11] Patent Number: 5,710,996
[45] Date of Patent: Jan. 20, 1998

[54] ADAPTIVE NOISE CANCELING SYSTEM AND FM RADIO COMMUNICATION RECEIVER USING SAID SYSTEM

[75] Inventors: Shigeki Kajimoto, Osaka; Weimin Sun, Nara, both of Japan

[73] Assignee: Icom Incorporated, Osaka, Japan

[21] Appl. No.: 452,282

[22] Filed: May 26, 1995

[30] Foreign Application Priority Data

Sep. 30, 1994 [JP] Japan .................................. 6-237455

[51] Int. Cl.$^6$ .................................................. H04B 1/12
[52] U.S. Cl. .......................... 455/309; 455/306; 455/304
[58] Field of Search ................................ 455/205, 296, 455/303, 304, 305, 306, 307, 309

[56] References Cited

U.S. PATENT DOCUMENTS

| | | |
|---|---|---|
| 4,238,746 | 12/1980 | McCool et al. . |
| 4,243,935 | 1/1981 | McCool et al. . |
| 4,415,872 | 11/1983 | Karabinis ................... 455/305 |
| 4,709,269 | 11/1987 | Ozaki ......................... 455/306 |
| 4,914,398 | 4/1990 | Jove et al. ................... 455/303 |
| 4,931,743 | 6/1990 | Fukuda et al. ............... 455/306 |
| 5,142,551 | 8/1992 | Borth et al. ................. 455/305 |
| 5,226,057 | 7/1993 | Boren . |
| 5,241,687 | 8/1993 | Short ......................... 455/304 |

FOREIGN PATENT DOCUMENTS 56-1627  1/1981  Japan ..................................... 455/304

OTHER PUBLICATIONS

IEEE International Symposium on Circuits and Systems Proceedings, vol.3, pp. 1143–1157, entitled: "Principles and Applications of Adaptive Filters: A Tutorial Review", Apr. 1980.
Proceedings of the IEEE, vol. 63, No. 12, pp. 1692–1716, Dec. 1975, "Adaptive Noise Cancelling: Principles and Applications", Bernard Widrow et al.

*Primary Examiner*—Reinhard J. Eisenzopf
*Assistant Examiner*—Lester G. Kincaid
*Attorney, Agent, or Firm*—Wenderoth, Lind & Ponack

[57] ABSTRACT

An adaptive noise canceling system for improving a S/N ratio and clarity of a output signal includes a delay for delaying the input signal X(j) by a fixed time delay a, a filter for filtering the delayed signal D(j), a subtracter for subtracting the filtered signal Y(j) from the input signal X(j), a coefficients adjuster for adaptively adjusting coefficients of the filter using a least-means-square (LMS) algorithm, a level adjuster for adjusting a level of an error signal $\epsilon(j)$ which is obtained by subtracting the filtered signal Y(j) from the input signal X(j), and an adder for adding the level adjusted signal $\epsilon(j)$ to the filtered signal Y(j).

3 Claims, 10 Drawing Sheets

ADAPTIVE NOISE CANCELING SYSTEM AND FM RADIO COMMUNICATION RECEIVER USING SAID SYSTEM

BACKGROUND OF THE INVENTION

1. Field of the Invention

The present invention relates to a frequency modulation (FM) radio communication receiver with an adaptive noise canceler which cancels interference and noise from the output signal of FM radio communication receiver, and relates to an adaptive noise canceling system for improving signal-to-noise (S/N) ratio and the clarity of the output signal.

2. Description the Related Art

Because the transmitted signal level is attenuated and much interference and noise are easily involved in an inferior transmitted condition, particularly, in a bad receiving condition (for example, when a received signal level is lower than the S/N ratio threshold), in the case that a squelch function is turned off (monitor function turned on), or in the case that the squelch is tailed, the involved interference and noise (for example, white noise and broadband noise which are common in radio communication) are output from loudspeaker.

The output interference and noise are high enough to be offensive to the listener.

Adaptive noise cancelers for canceling unwanted signals (noise and interference) such as U.S. Pat. No. 4,238,745 adaptive line enhancer, are known. (FIG. 1)

This adaptive line enhancer comprises;

delaying means for delaying an input signal X(j) by a fixed time delay δ, weighted means for adaptively filtering the delayed signal to output a signal Y(j) using a least-means-square (LMS) algorithm, subtracting means for subtracting the signal Y(j) from the signal X(j) to output an error signal ε(j).

multiplying means for multiplying the error signal ε(j) by a gain μ, the output of multiplying means being fed back to the weighted means, to cause the weight of the weighted means to be readjusted in a manner to minimize the difference between the signal X(j) and the signal Y(j), thereby minimizing the error signal ε(j).

Although S/N ratio of the output signal Y(j) from the above adaptive line enhancer is improved, the clarity of the signal Y(j) becomes worse. Especially when the input S/N ratio is low, the clarity becomes much worse. This is because the error signal obtained by subtracting the signal Y(j) from the signal X(j) contains lots of wanted signal components which are treated as unwanted components.

Background information useful for understanding this invention appears in the article by Widrow B. et al, entitled "Adaptive Noise Cancelling: Principles and Applications", which appeared in the December 1975 issue of Proc. of the IEEE, Vol. 63, No. 12, Pp. 1692-1719.

SUMMARY OF THE INVENTION

It is the first object of the present invention to provide an FM radio communication receiver that has a function of canceling the interference and noise which cannot be canceled by the conventional FM radio communication receiver. For example, canceling FM noise and interference in a bad receiving condition. When the squelch function is turned off (monitor function is turned on) and, when the squelch is tailed.

It is the second object of the present invention to provide an adaptive noise canceling system for improving S/N ratio and the clarity of the output signal, especially the clarity of speech.

It is the third object of this invention to provide an FM radio communication receiver with an adaptive noise canceling system that can cancel interference and noise, and improve the clarity of the output audio signal.

To achieve the above objects, an FM (Frequency Modulation) radio communication receiver with an adaptive noise canceler defined in the present invention comprises:

radio receiving means for receiving an RF (Radio Frequency) signal;

demodulating means for demodulating the received RF signal, the output signal of the demodulating means being a signal;

adaptive noise canceling means for adaptively canceling interference and noise from the demodulated signal X(j); and AF (Audio Frequency) signal outputting means for outputting the signal Y(j) of the adaptive noise canceling means.

An adaptive noise canceling system defined in the present invention comprises:

adaptive noise canceling means, having as an input signal X(j), for adaptively canceling interference and noise from the input signal X(j);

level adjusting means for adjusting a level of an error signal ε(j) which is obtained by subtracting the output signal Y(j) of the adaptive noise canceling means for the input signal X(j), the output of the level adjusting means being a signal ε'(j); and adding means for adding the level adjusted signal ε'(j) to the output signal Y(j) of the adaptive noise canceling means, the output the adding means being a signal Z(j).

An FM radio communication receiver with the adaptive noise canceling system defined in the present invention comprises:

radio receiving means for receiving an RF (Radio Frequency) signal;

demodulating means for demodulating the received RF signal, the output signal of the demodulating means being a signal X(j);

adaptive noise canceling system, the output signal of the adaptive noise canceling means being a signal Z(j); and AF (Audio Frequency) signal outputting means for outputting the signal Z(j) of the adaptive noise canceling system;

wherein the adaptive noise canceling system includes:

adaptive noise canceling means, having as an input signal X(j), for adaptively canceling interference and noise from the demodulated signal X(j);

level adjusting means for adjusting a level of an error signal ε(j) which is obtained by subtracting the output signal Y(j) of the adaptive noise canceling means from the demodulated signal X(j), the output of the level adjusting means being a signal ε'(j); and adding means for adding the level adjusted signal ε'(j) to the output signal of the adaptive canceling means, the output of the adding means being a signal Z(j).

DETAILED DESCRIPTION OF THE PREFERRED EMBODIMENT

Figure 1:
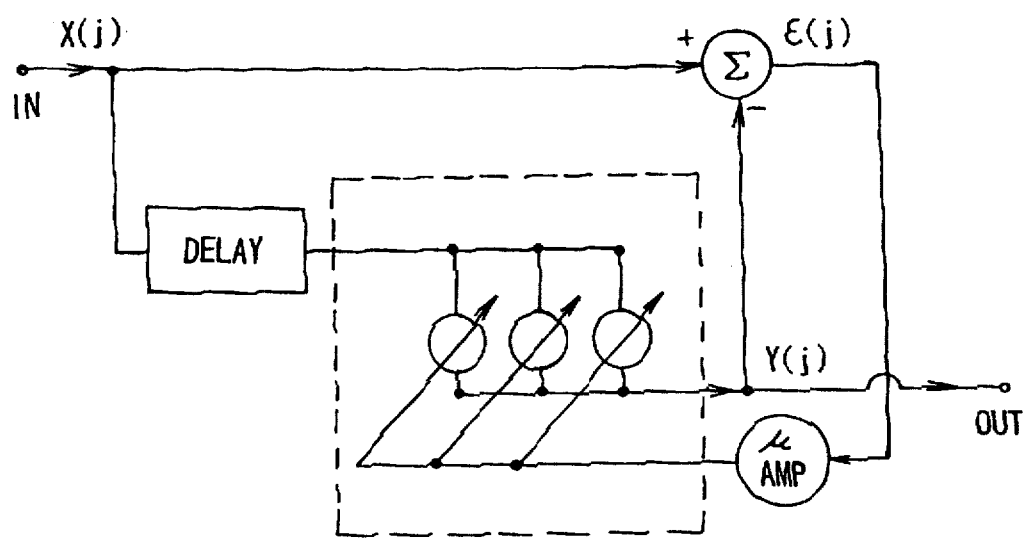
FIG. 1 is a block diagram of an adaptive noise canceler (an adaptive line enhancer) of the related art.

For the purposes of promoting an understanding of the principles of the invention, reference will now be made to the embodiment illustrated in the drawings. It will nevertheless be understood the no limitation of the scope of the invention is thereby intended such alteration and further modifications in the illustrated device, and such further applications of the principles of the invention as illustrated therein being contemplated as would normally occur to one skilled in the art to which the invention relates.

EMBODIMENT 1

Figure 2:
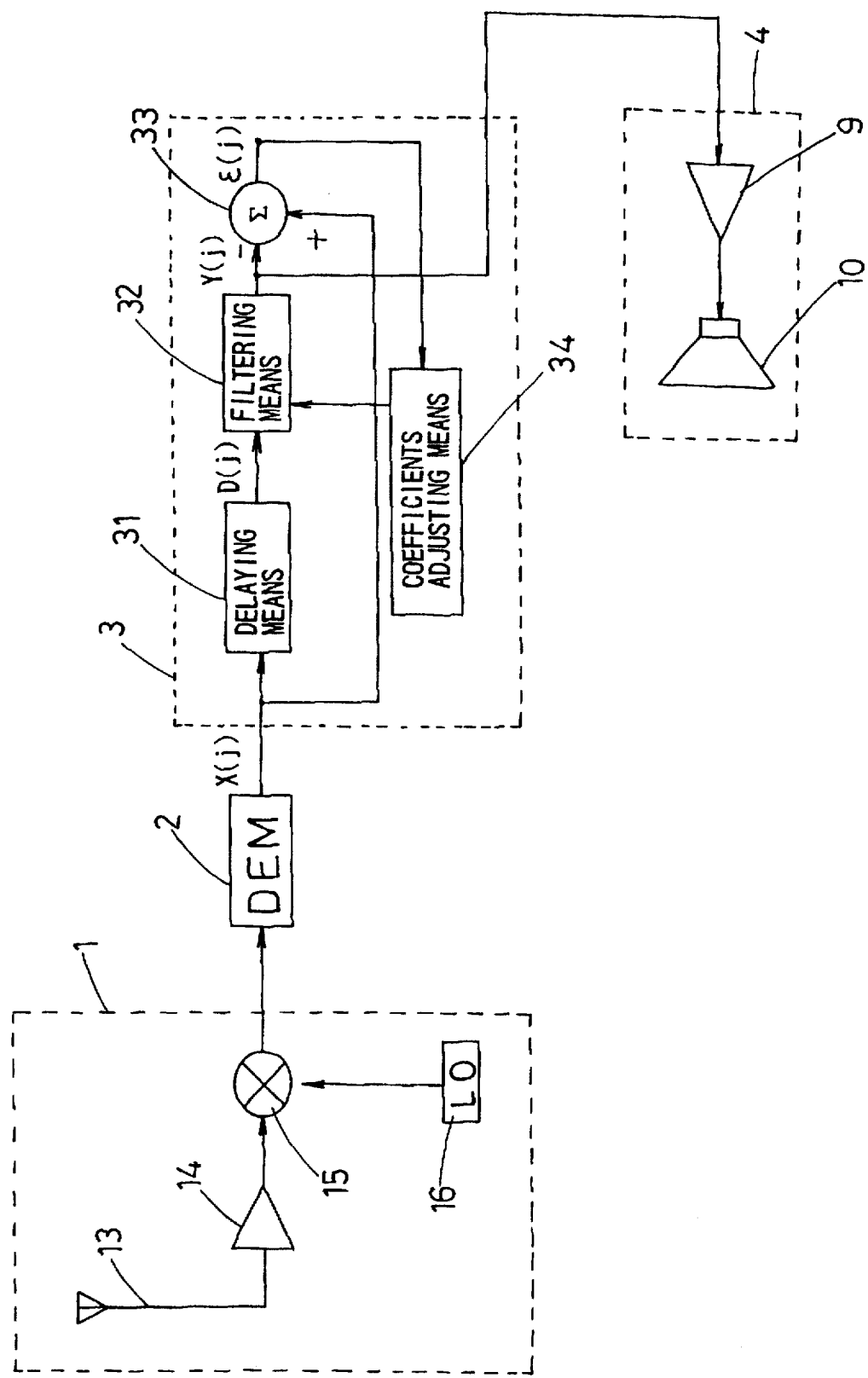
FIG. 2 is a block diagram of an FM radio communication receiver with an adaptive noise canceling means of a first embodiment of the present invention.

FIG. 2 is the block diagram of an FM (frequency modulation) radio communication receiver of the first embodiment of the present invention. In FIG. 2, 1 is a receiving means, 2 is a demodulating means, 3 is an adaptive noise canceling means which cancels noise and interference from the demodulated signal X(j) of the demodulating means 2, 4 is an AF (Audio Frequency) signal outputting means, 9 is an AF amplifier which amplifies the output signal Y(j) of the adaptive noise canceling means 3, 10 is a loudspeaker which outputs the amplified signal by the AF amplifier 9, 13 is an antenna, 14 is an RF (Radio frequency) amplifier, 15 is a mixer, 16 is an local oscillator, 31 is an delaying means, 32 is a filtering means, 33 is a subtracting means, 33 is a coefficients adjusting means.

The antenna 13, the RF amplifier 14, the mixer 15 and the local oscillator 16 compose the receiving means 1, the AF amplifier 9 and the loudspeaker 10 compose the AF signal outputting means 4.

The delaying means 31, the filtering means 32, the subtracting means 32, the coefficients adjusting means 33 compose the adaptive noise canceling means.

The RF signal from the antenna 13 is amplified by the RF amplifier 14 and mixed with the local oscillator signal from the local oscillator 16 by the mixer 15 to make an IF (intermediate frequency) signal.

The IF signal from the receiving means 1 is input to the demodulating means 2 and the demodulated signal X(j) of the demodulating means 2 is output.

Figure 4:
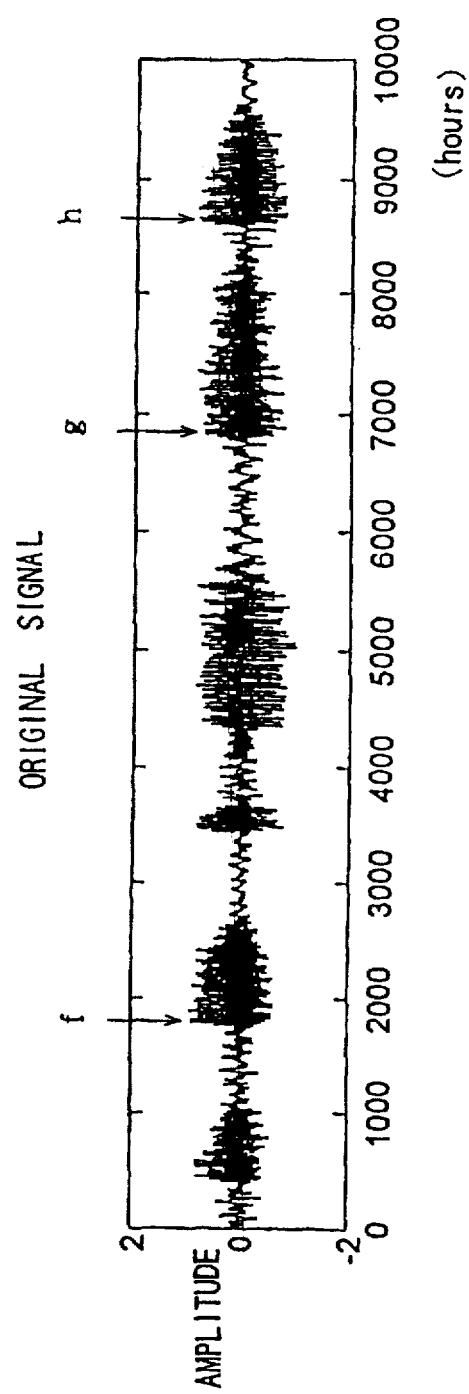
FIG. 4 is a graph of an original signal (speech signal).

FIG. 4 is an original signal. The demodulated signal X(j) shown in FIG. 6 includes the original signal and a noise shown in FIG. 5.

The demodulated signal X(j) is input to the adaptive noise canceling means 3 for adaptively canceling the noise and interference from the demodulated signal X(j).

The output signal Y(j) from the adaptive noise canceling means 3 is amplified by the AF amplifier 9 and the amplified signal output from the loudspeaker 10.

Figure 6:
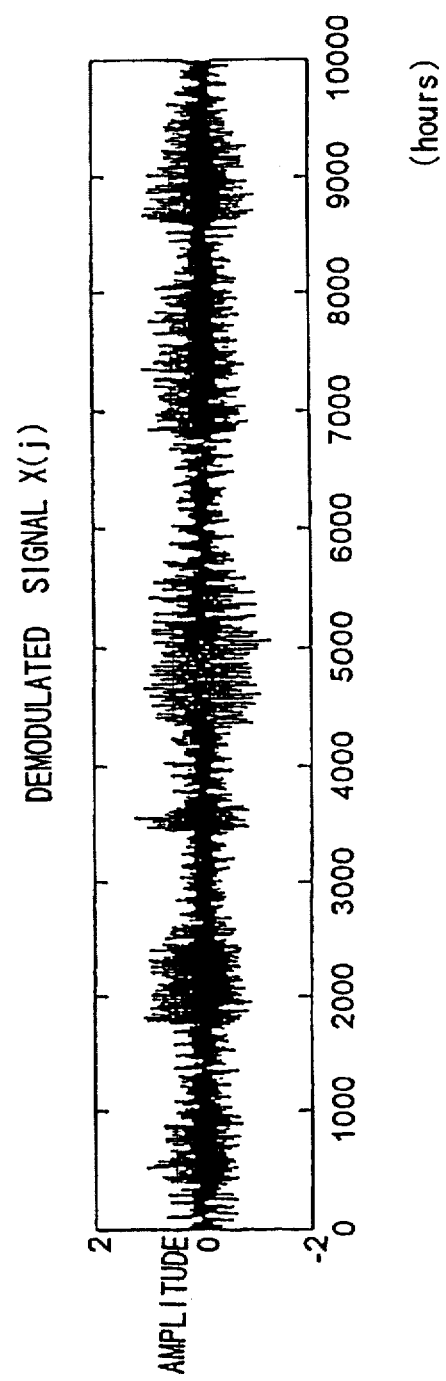
FIG. 6 is a graph of the input signal X(j) of the adaptive noise canceling means.
Figure 7:
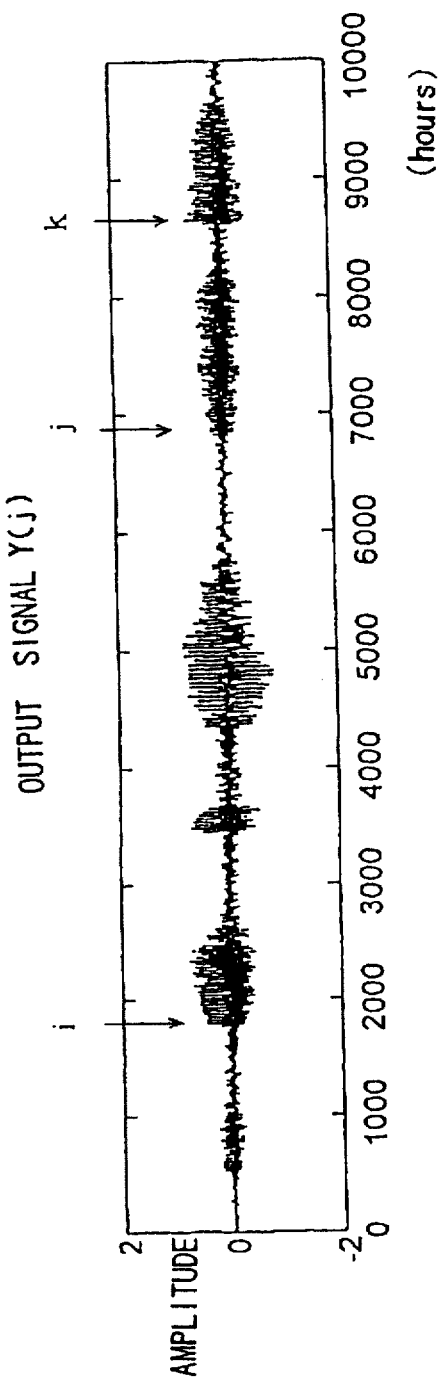
FIG. 7 is a graph of the output signal Y(j) of the adaptive noise canceling means.

Comparing FIG. 7 which describes the output signal Y(j) of the adaptive noise canceling means 3 with FIG. 6, the noise level is reduced and S/N ratio is improved greatly in the output signal Y(j), especially in a bad receiving condition such as squelch off and squelch-tail.

In the FIG. 2, the adaptive noise canceling means 3 consists of the delaying means 31, the filtering means 32, the subtracting means 33 and the coefficients adjusting means 34. The structure, however, is not limited to the above mentioned.

EMBODIMENT 2

Furthermore in the second embodiment, for improving S/N ratio and clarity of the demodulated signal X(j), an adaptive noise canceling system of the present invention is adopted.

Figure 3:
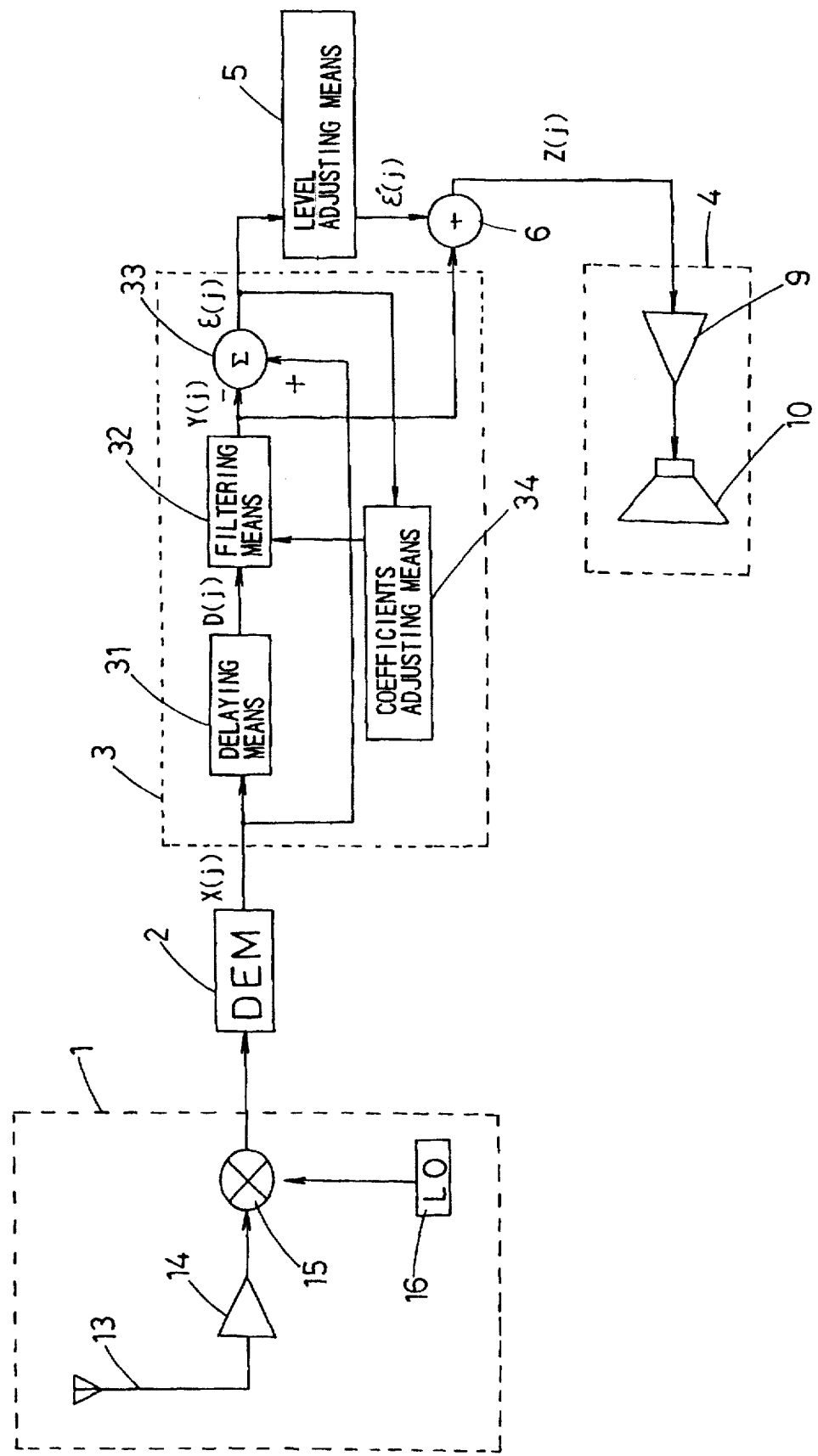
FIG. 3 is a block diagram of an FM radio communication receiver with an adaptive noise canceling system of a second embodiment of the present invention.

FIG. 3 is the block diagram of an FM radio communication receiver which uses the adaptive noise canceling system of the present invention. The explanation of the same elements as them in FIG. 2 are omitted.

The adaptive noise canceling means 3 comprises;

delaying means 31 for delaying the demodulated signal X(j) by a fixed time delay δ, the output of the delaying means 31 being a delayed signal D(j);

filtering means 32 for filtering the delayed signal D(j), the output of the filtering means 32 being a signal Y(j);

subtracting means 33 for subtracting the signal Y(j) from the signal X(j), the output of the subtracting means 32 being an error signal ε(j);

coefficients adjusting means 34 for adaptively adjusting coefficients of the filtering means 32 using a least-means-square (LMS) algorithm, the output of the coefficients adjusting means 34 being the coefficients of the filtering means 32.

LMS The algorithm is, for example, expressed as follows, $$\vec{W}(j+1)=\vec{W}(j)+2\mu\epsilon(j)\cdot X(j)$$

where W(j) expresses the coefficients of the filtering means, and μ represents a step size parameter.

In FIG. 3, 5 is a level adjusting means for adjusting a level of the error signal ε(j), 6 is an adding means for adding the output signal ε'(j) of the level adjusting means 5 to the output signal Y(j) of the adaptive noise canceling means 3.

The adaptive noise canceling means 3, the level adjusting means 5 and the adding means 6 compose the adaptive noise canceling system of the present invention.

Functions of the adaptive noise canceling means 3, the level adjusting means 5 and the adding means 6 are explained in detail using FIG. 4 to FIG. 9.

Figure 5:
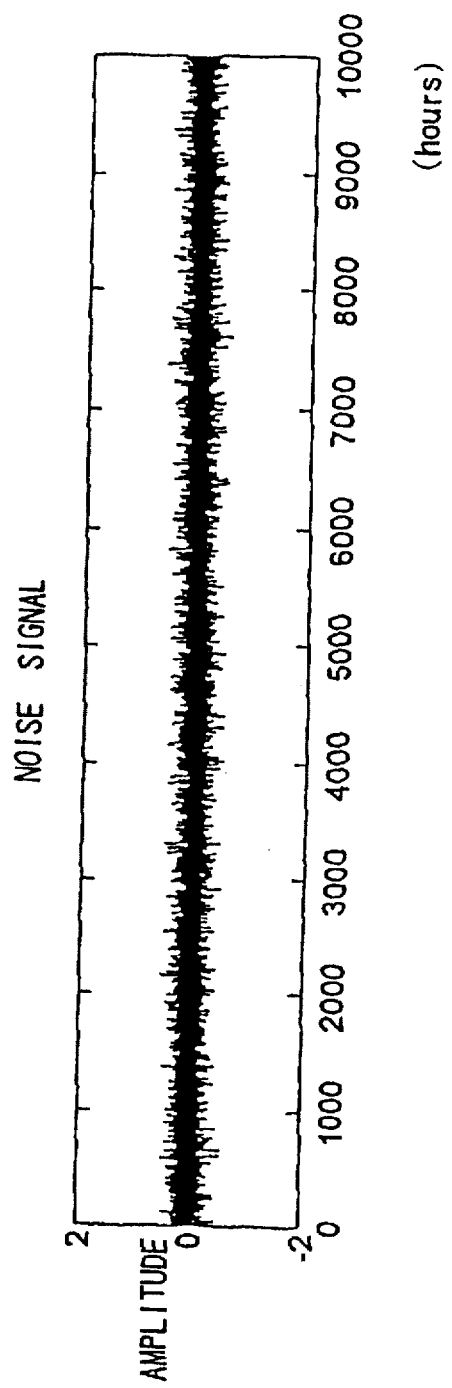
FIG. 5 is a graph of the interference (white noise).

At first, as described in embodiment 1, FIG. 4 shows an original signal, FIG. 5 shows a noise involved in the original signal and the actual demodulated signal X(j) in shown in FIG. 6.

The demodulated signal X(j) is input to the delaying means 31 of the adaptive noise canceling means 3.

In the delaying means 31, the demodulated signal X(j) is delayed by a fixed time, and the delayed signal D(j) is output to the filtering means 32.

In the filtering means 32, the delayed signal D(j) is filtered, and the output signal Y(j) of the filtering means 32 is shown in FIG. 7. FIG. 6 is a graph of the signal Y(j) of the filtering means 32. The demodulated signal X(j) and the output signal Y(j) of the filtering means 32 are input to the subtracting means 33 and the error signal ∈(j) obtained by subtracting the signal Y(j) from the signal X(j) is output.

Figure 8:
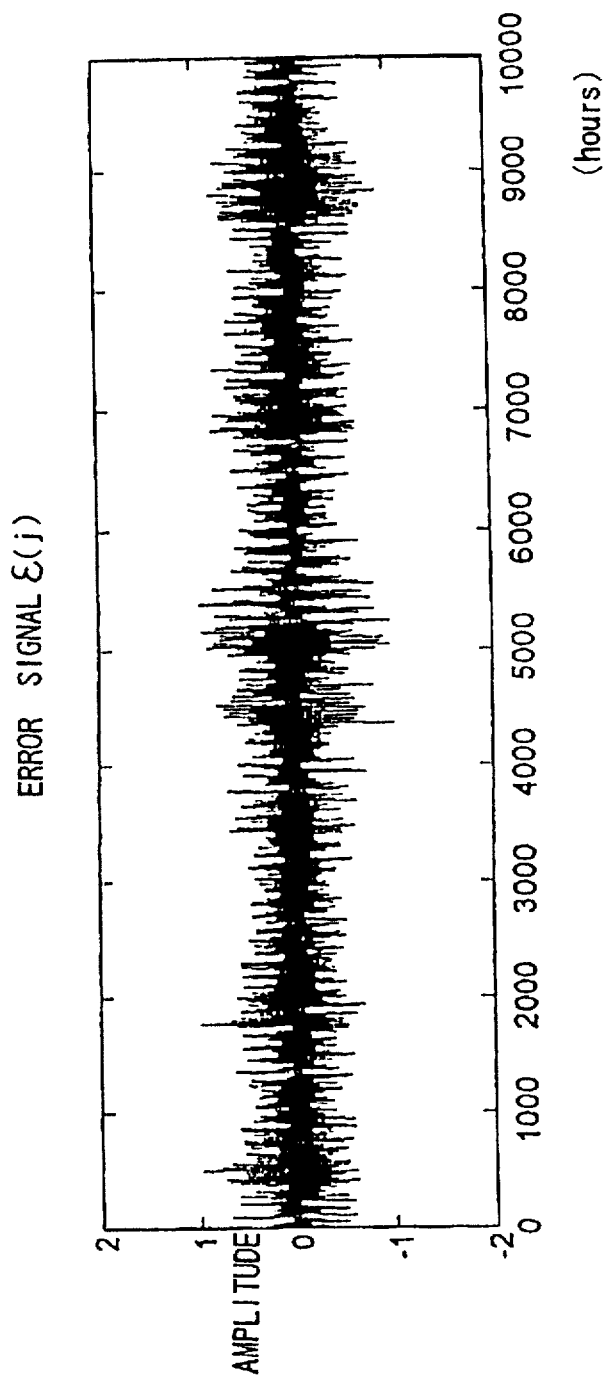
FIG. 8 is a graph of the error signal ε(j).

FIG. 8 is a graph of the error signal ∈(j). The error signal ∈(j) is input to the coefficients adjusting means 34. A LMS algorithm is used to adaptively adjust the coefficients of the filtering means 32.

In the ideal adaptive noise canceling means, the error signal ∈(j) should only contain the noise and interference involved in the demodulated signal X(j). However, It is impossible to obtain such an error signal ∈(j) because some components of the original signal are involved in the error signal ∈(j), and the actual signal ∈(j) is shown in FIG. 8.

Since the error signal ∈(j) contains some components of the original signal, the clarity of the output signal Y(j) become bad.

In the FIG. 4, it is known that the signal at points f, g, and h changes very rapidly. However, the output signal Y(j) at points i, j, and k in FIG. 7 changes gradually. The signal components at these points are lost in the output signal Y(j) and the clarity of the output signal Y(j) becomes bad.

Figure 9:
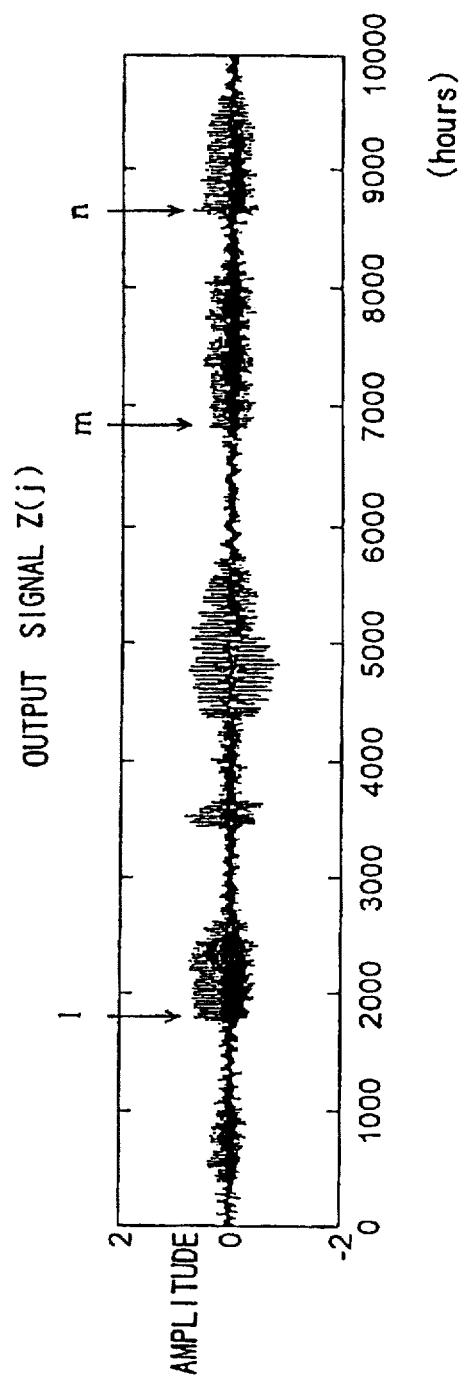
FIG. 9 is a graph of the output signal Z(j) of the adaptive noise canceling system.

Therefore, in this embodiment, the level adjusting means 5 is used for adjusting the level of the error signal ∈(j), for example, the level of the error signal ∈(j) is adjusted to be 0.3·∈(j). The adding means 6 is used for adding the level adjusted error signal ∈'(j) to the output signal Y(j). FIG. 9 shows the output signal Z(j) of the adding means 6. It is obvious that the signal Z(j) at points l, m, n is improved compared to the signal Y(j) at points i, j, and k in FIG. 7.

Although S/N ratio of the output signal Z(j) becomes a little worse, the clarity of the output signal Z(j) is improved.

Figure 10:
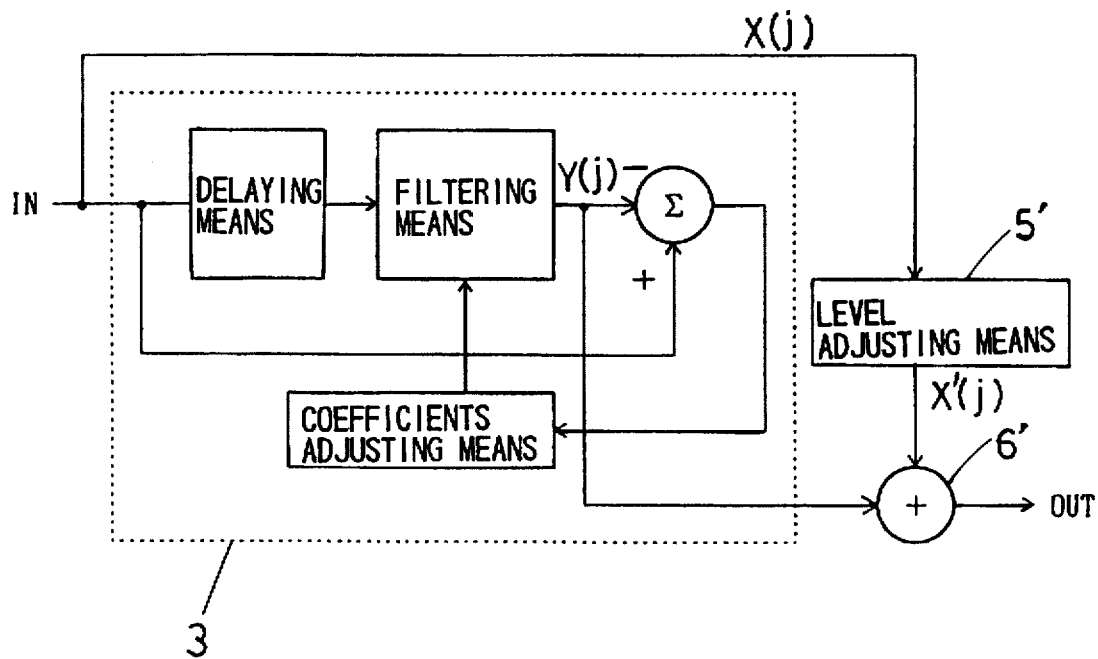
FIG. 10 is a block diagram of an adaptive noise canceling system of an other embodiment of the present invention.

Further, in the adaptive noise canceling system as shown in FIG. 10, the level adjusting means 5' is also used for adjusting the level of the demodulated signal X(j), for example, the level of the demodulated signal X(j) is adjusted to be 0.3·X(j). The adding means 6' is used for adding the level adjusted demodulated signal X'(j) to the output signal Y(j).

Figure 11:
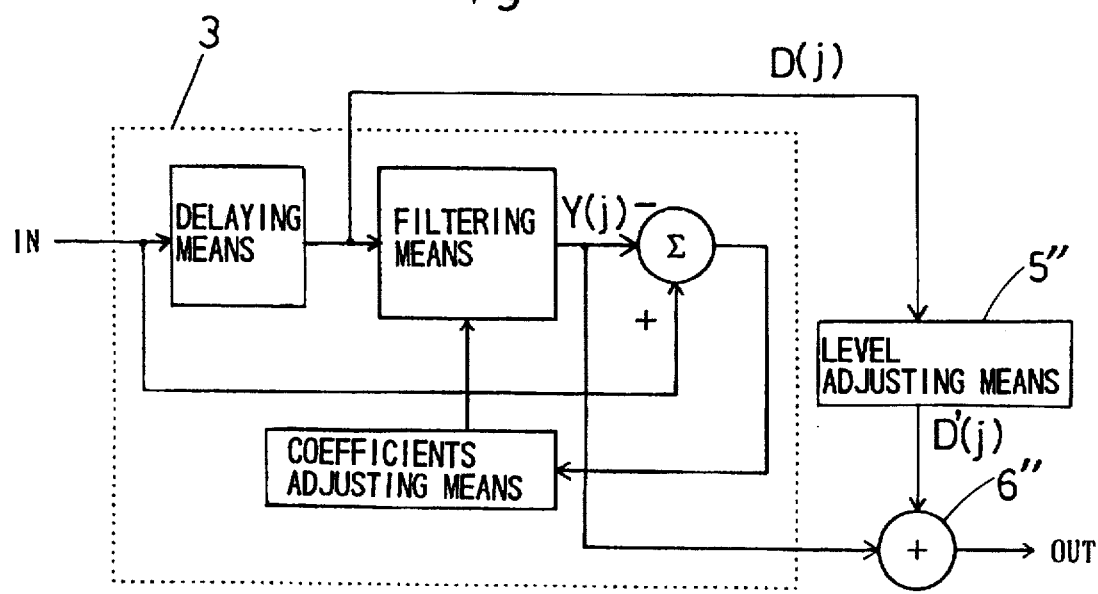
FIG. 11 is a block diagram of an adaptive noise canceling system of an other embodiment of the present invention.

Furthermore, in the adaptive noise canceling system as shown in FIG. 11, the level adjusting means 5" is also used for adjusting the level of the delayed signal D(j), for example, the level of the delayed signal D(j) is adjusted to be 0.3·D(j). The adding means 6" is used for adding the level adjusted delayed signal D'(j) to the output signal Y(j).

In the FIG. 3, the adaptive noise canceling means 3 consists of the delaying means 31, the filtering means 32, the subtracting means 33 and the coefficients adjusting means 34. The structure, however, is not limited to the above mentioned.

The present invention provides an adaptive noise canceling means behind an FM radio communication receiver for improved S/N ratio of the demodulated signal X(j) from the receiver. On the other hand, it can cancel FM noise and interference for the adaptive noise canceling means even in a bad receiving condition, such as, squelch off and squelch tail.

Further, the adaptive noise canceling system of the present invention can be used to improve the clarity of the input signal X(j) and cancel the noise and interference from the output signal Y(j).

Furthermore, an FM radio communication receiver with the adaptive noise canceling system of the present invention can improve S/N ratio and clarity of the demodulated signal X(j) by adjusting the level of the error signal ∈(j), the level of the demodulated signal X(j); the level of the delaying signal D(j) and adding them to the output signal Y(j), respectively.

What is claimed:

1. A frequency modulation radio communication receiver using an adaptive noise canceling system for improving clarity of an output signal, said receiver comprising:

a radio receiving means for receiving a radio frequency signal;

a demodulating means for demodulating the radio frequency signal, an output of said demodulating means being a signal X(j);

an adaptive noise canceling system for improving a S/N ratio and clarity of an output signal Z(j);

an audio frequency signal outputting means for outputting an audio signal of the output signal Z(j) of said adaptive noise canceling system;

wherein said adaptive noise canceling system includes:

a delaying means for delaying the demodulated signal X(j) by a fixed time delay δ, an output of said delaying means being a signal D(j);

a filtering means, having as an input the signal D(j), for filtering the delayed signal D(j), an output of said filtering means comprising a signal Y(j);

a subtracting means, having as inputs the signals X(j) and Y(j), for subtracting the signal Y(j) from the signal X(j), an output of said subtracting means being an error signal ∈(j);

a coefficients adjusting means, having as an input the error signal ∈(j), for adaptively adjusting coefficients of said filtering means using a least-means-square (LMS) algorithm, an output of said coefficients adjusting means being the coefficients of said filtering means;

a level adjusting means, having as an input the error signal ∈(j), for adjusting a level of the error signal ∈(j), an output of said level adjusting means being a signal ∈'(j);

an adding means for adding the level adjusted signal ∈'(j) to the output signal Y(j) of said filtering means, an output of the adding means being the output signal Z(j).

2. A frequency modulation radio communication receiver using an adaptive noise canceling system for improving clarity of an output signal, said receiver comprising:

a radio receiving means for receiving a radio frequency signal;

a demodulating means for demodulating the radio frequency signal, an output of said demodulating means being a signal X(j);

an adaptive noise canceling system for improving a S/N ratio and clarity of an output signal Z(j);

an audio frequency signal outputting means for outputting an audio signal of the output signal Z(j) of said adaptive noise canceling system;

wherein said adaptive noise canceling system includes:

a delaying means for delaying the demodulated signal X(j) by a fixed time delay δ, an output of said delaying means being a delayed signal D(j);

a filtering means, having as an input the delayed signal D(j), for filtering the delayed signal D(j), an output of said filtering means comprising a signal Y(j); a subtracting means, having as inputs the signals X(j) and Y(j), for subtracting the signal Y(j) from the input signal X(j), an output of said subtracting means being an error signal ∈(j);

a coefficients adjusting means, having as an input the error signal ε(j), for adaptively adjusting coefficients of said filtering means using a least-means-square (LMS) algorithm, an output of said coefficients adjusting means being the coefficients of said filtering means;

a level adjusting means, having as an input the demodulated signal X(j), for adjusting a level of the demodulated signal X(j), an output of said level adjusting means being a signal X'(j);

an adding means having as inputs the signals Y(j) and X'(j), for adding the signal X'(j) to the signal Y(j), an output of said adding means being the output signal Z(j).

3. A frequency modulation radio communication receiver using an adaptive noise canceling system for improving clarity of an output signal, said receiver comprising:

a radio receiving means for receiving a radio frequency signal;

a demodulating means for demodulating the radio frequency signal, an output of said demodulating means being a signal X(j);

an adaptive noise canceling system for improving a S/N ratio and clarity of an output signal Z(j);

an audio frequency signal outputting means for outputting an audio signal of the output signal Z(j) of said adaptive noise canceling system;

wherein said adaptive noise canceling system includes:

a delaying means for delaying the demodulated signal X(j) by a fixed time delay δ, an output of said delaying means being a signal D(j);

a filtering means, having as an input the delayed signal D(j), for filtering the delayed signal D(j), an output of said filtering means being a signal Y(j);

a subtracting means, having as inputs the signals X(j) and Y(j), for subtracting the signal Y(j) from the signal X(j), an output of said subtracting means being an error signal δ(j);

a coefficients adjusting means, having as an input the error signal δ(j), for adaptively adjusting coefficients of said filtering means using a least-means-square (LMS) algorithm, an output of said coefficients adjusting means being the coefficients of said filtering means;

a level adjusting means, having as an input the delayed signal D(j), for adjusting a level of the delayed signal D(j), an output of said level adjusting means being a signal D'(j);

an adding means, having as inputs the signals Y(j) and D(j), for adding the signal D'(j) to the signal Y(j), an output of said adding means being the output signal Z(j).

\* \* \* \* \*

UNITED STATES PATENT AND TRADEMARK OFFICE
CERTIFICATE OF CORRECTION

PATENT NO. : 5,710,996

DATED : January 20, 1998

INVENTOR(S) : Shigeki KAJIMOTO et al.

It is certified that error appears in the above-identified patent and that said Letters Patent is hereby corrected as shown below:

In column 8, line 11, "$\delta(j)$" should be --$\epsilon(j)$--;

In column 8, line 13, '$\delta(j)$" should be --$\epsilon(j)$--.

Signed and Sealed this

Nineteenth Day of May, 1998

Attest:

BRUCE LEHMAN

Attesting Officer

Commissioner of Patents and Trademarks